United States Patent [19]
Calame

[11] 3,742,610
[45] July 3, 1973

[54] MEASURING DEVICE OF TWO DIMENSIONAL DISPLACEMENTS

[75] Inventor: Michel Calame, Grand-Lancy, Switzerland

[73] Assignee: Societe Genevoise D'Instruments De Physique, Geneva, Switzerland

[22] Filed: Jan. 12, 1971

[21] Appl. No.: 105,809

[30] Foreign Application Priority Data
Feb. 16, 1970 Switzerland................ 2176/70

[52] U.S. Cl............. 33/172 E, 33/174 E, 33/172 R
[51] Int. Cl. ............................................. G01b 3/22
[58] Field of Search..................... 33/172 B, 172 E, 33/147 K

[56] References Cited
UNITED STATES PATENTS
1,461,083  7/1923  Damerell................... 33/172 B X
2,090,495  8/1937  Witchger................... 33/172 B
2,545,881  3/1951  Graham..................... 33/172 E UX
3,442,121  5/1969  Wirz............................ 33/172 E X
3,482,323  12/1969  Hamel et al................. 33/172 E FOREIGN PATENTS OR APPLICATIONS
864,003  1/1953  Germany.................... 33/174 E
437,824  11/1967  Switzerland................. 33/147 K Primary Examiner—Robert B. Hull
Attorney—Young & Thompson

[57] ABSTRACT

The invention concerns a two dimensional displacement measuring device, comprising a mechanical feeler fixed to a lateral measuring lever hinged on a movable member of a deformable parallelogram about an axis which is perpendicular to the direction of displacement of this movable member and two detectors delivering electrical signals the amplitude of which varies with displacement. These detectors are actuated the one by the said movable member and the other by the said measuring lever. Adjusting means are provided for the measuring pressure of the feeler both axially and laterally as well as restraining means canceling selectively the sensitivity of the feeler either axially or laterally.

7 Claims, 2 Drawing Figures

PATENTED JUL 3 1973  3,742,610

MEASURING DEVICE OF TWO DIMENSIONAL DISPLACEMENTS

The invention concerns a two dimensional feeler, that is to say, a feeler which is sensitive both axially and laterally. There exists a microscope with feeler, which enables one to locate the position of a work-piece to be measured by the axial displacement of the feeler, that is to say parallel to the axis of the cylindrical body of the microscope; or lateral displacement, that is to say perpendicular to the axis of the body; or at least simultaneously in the axial and lateral directions.

This microscope is an optical one, and presents thus the drawback of having a sensitivity which is limited by the optical enlargement and it is not well adapted to certain measuring machines which yield the result of the measurements in numerical form.

There exist electronic detectors the feelers of which are sensitive in the axial direction. There exist others the feelers of which are sensitive in the lateral direction. These electronic feelers are thus always unidirectional.

The advantage of the electronic detector is that the sensitivity may be very high, since the electrical signal which is delivered may more easily be amplified than an optical image can be enlarged. Furthermore, due to its electric nature, this signal is well adapted to be used on a measuring machine having a numerical display.

The device according to the invention tends to obviate the preceding drawbacks and to combine the advantages of the existing feelers.

This two dimensional displacement measuring device comprises a mechanical feeler fixed to a lateral measuring lever, hinged on a movable member of a parallelogram which is deformable about an axis which is perpendicular to the displacement direction of this movable member, two detectors, delivering electric signals, the amplitude of which depends on a mechanical displacement, actuated the one by the said movable member and the other by the measuring lever, and which comprises further means for adjusting the measuring pressure of the feeler both axially and laterally and restraining means to selectively cancel the sensitivity of the feeler either axially or laterally.

The attached drawing shows schematically and by way of example one embodiment of the two dimensional measuring device according to the invention.

Figure 1:
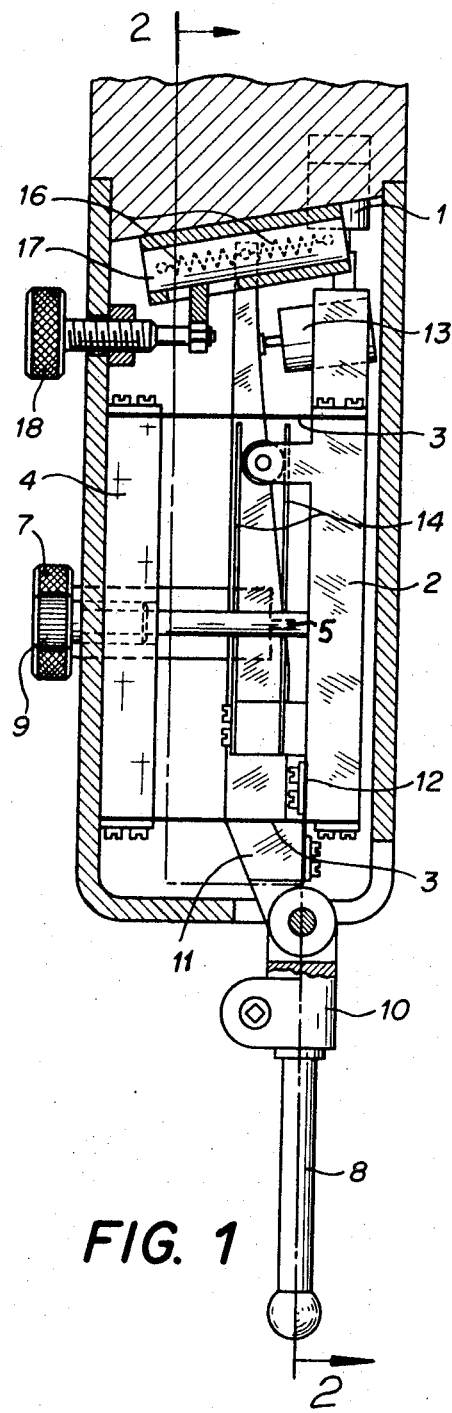
FIG. 1 shows it in longitudinal cross section on the line 1—1 of FIG. 2.
Figure 2:
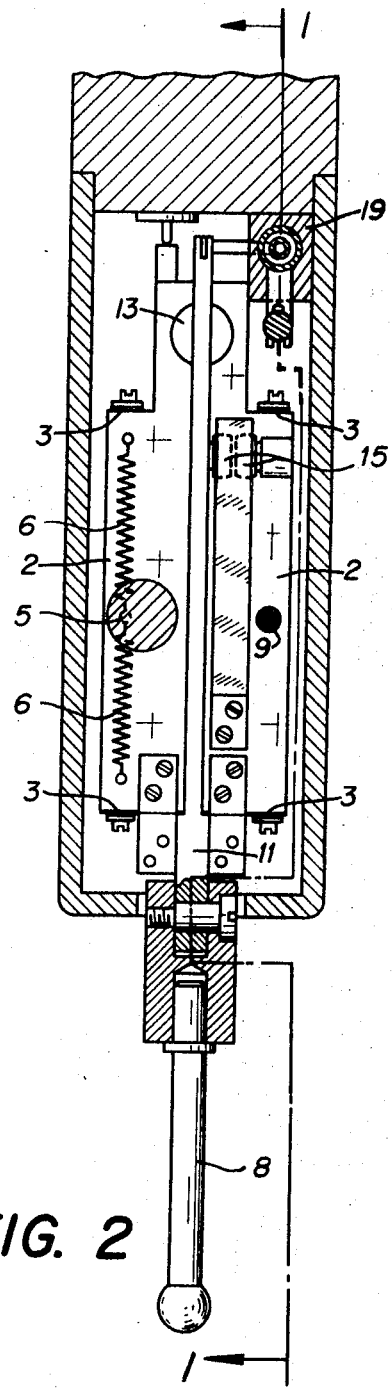
FIG. 2 is also a longitudinal cross section but on the line 11—11 of FIG. 1.

The detector 1 is sensitive to axial translational displacement of the member 2 which constitutes with the resilient blades 3, which are four in the example shown, and the body 4 a deformable parallelepiped the body 4 being fixed so as to be effectively a unitary part of the frame or housing of the measuring device, on which frame detector 1 is mounted. The axial measuring force applied through the feeler 8 to the part to be measured, not shown, is given by the weight of the cross member 2 and the parts which are affixed thereto. An adjustment of this measuring force may be effected thanks to two springs 6 having opposed actions, the common attaching point of which is located on the eccentric lug 5 whereas the two ends are fixed to the member 2. According to the position of the eccentric lug 5, adjusted by the knob 7, the resulting forces of the springs 6 act upwards or downwards so that there is an adjustment of the axial measuring force. The restraining screw 9 threaded in the body 4 enables one to push on the member 2. The resulting friction renders the parallelepiped rigid and suppresses the axial sensitivity of the feeler 8.

The feeler 8 fastened in the feeler-carrier 10 is unitary with the level 11 which is fixed by means of the resilient blades 12 to the lower end of the member 2. An electronic detector 13 is sensitive to the lateral displacements that the feeler 8 may effect due to the bending of the blades 12. The lever 11 is returned to its balance position due to the bending forces of the blades 12 and through the thrust which paired restraining springs 14, fastened to the member 2, exert on the two rollers 15. One of the rollers 15 is journaled on an arm of the member 2, whereas the other is journaled on the lever 11. The force which the springs 14 apply to the last named roller is such that the balance or neutral position of the lever 11 is perfectly definite and without any other action. It is thus practically immobilized laterally and thus without any lateral sensitivity. The feeler 8 becomes laterally sensitive only when the counter-acting springs 16, which have connections each to a respective end of slide 17 and to the lever 11, apply on the upper end of the lever 11 an additional force directed towards the left or towards the right according to the direction in which the slide 17 in a fixed guide 19 is displaced by means of the screw 18. In other words, the springs 16 enable an adjustment of the lateral measuring force as the springs 6 enable an adjustment of the axial measuring force.

I claim

1. A two dimensional displacement measuring device, comprising a frame, a mechanical feeler, a lateral movement measuring lever secured rigidly to the feeler, means defining a deformable parallelogram having one side fixed relative to the frame and having a movable member comprising the opposite side of said parallelogram free for translational movement, means hingedly mounting said lever on said movable member for swinging movement of said lever about an axis perpendicular to the direction of movement of said movable member, two detectors, one mounted on said frame in operative engagement with said movable member and delivering electrical signals the amplitude of which varies as the amount of mechanical displacement of said movable member relative to said frame and the other mounted on said measuring member in operative engagement with said lever, means to apply and to adjust the measuring pressure of said feeler both axially and laterally, and restraining means for opposing said swinging movement and for selectively preventing said translational movement.

2. Device according to claim 1, in which the deformable parallelogram comprises resilient blades connecting the upper and lower ends of the movable member to said frame.

3. Device according to claim 2, in which the means to apply and to adjust the measuring pressure in the axial direction comprises an eccentric pivoted on the frame and two springs, each spring being fixed between one point of this eccentric and one of the ends of the movable member, so that in neutral position the forces applied by the springs on the movable member compensate for the weight of the movable member and the parts which are fixed thereon.

4. Device according to claim 1, in which the hinge of the measuring lever on said movable member is provided by at least one resilient blade.

5. Device according to claim 4, in which the restraining means comprises a screw fitted in a tapped bore fixed relative to said frame and movable against said movable member to prevent axial displacement of said movable member.

6. Device according to claim 5, in which the restraining means comprise further two blade springs fixed at one of their ends on the movable member and the free ends of which are applied against the opposed sides of two rollers, the one roller being mounted on the movable member and the other roller being mounted on the measuring lever.

7. Device according to claim 4, in which the means to apply and to adjust the measuring pressure comprises a slide displaceable according to a direction which is approximately tangential to the direction of swinging movement of the free end of the measuring lever, and two springs having connections to this free end of the measuring lever and to an end of the slide so that in neutral position of the slide the forces applied by the springs on the measuring lever compensate when this lever is equally in its neutral position determined by the restraining means.

* * * * *